United States Patent
Vogt et al.

(10) Patent No.: US 12,445,132 B2
(45) Date of Patent: Oct. 14, 2025

(54) CRYPTOGRAPHIC HARDWARE SHARING SYSTEMS AND METHODS

(71) Applicant: Lattice Semiconductor Corporation, Hillsboro, OR (US)

(72) Inventors: Tim Vogt, San Jose, CA (US); Mark Everhard, San Jose, CA (US); Narasimhakumar Mangipudi, Portland, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 72 days.

(21) Appl. No.: 18/525,388

(22) Filed: Nov. 30, 2023

(65) Prior Publication Data

US 2024/0187001 A1 Jun. 6, 2024

Related U.S. Application Data

(60) Provisional application No. 63/429,777, filed on Dec. 2, 2022.

(51) Int. Cl.
*H03K 19/17768* (2020.01)
*H03K 19/173* (2006.01)

(52) U.S. Cl.
CPC ... *H03K 19/17768* (2013.01); *H03K 19/1737* (2013.01)

(58) Field of Classification Search
None
See application file for complete search history.

(56) References Cited

U.S. PATENT DOCUMENTS

| | | | |
|---|---|---|---|
| 7,716,497 B1 * | 5/2010 | Trimberger | G06F 21/73 365/186 |
| 2009/0113212 A1 | 4/2009 | Koehler et al. | |
| 2018/0091484 A1 | 3/2018 | Atta et al. | |
| 2018/0131528 A1 * | 5/2018 | Profumo | H04L 9/0866 |
| 2021/0083675 A1 * | 3/2021 | Chandra | G06F 9/44505 |

* cited by examiner

*Primary Examiner* — Anh Q Tran
(74) *Attorney, Agent, or Firm* — Haynes and Boone, LLP

(57) ABSTRACT

Various techniques are provided to implement cryptographic hardware sharing systems and methods. In one example, a programmable logic device (PLD) includes a configuration engine configured to provide configuration data for processing using a first set of security functions. The PLD further includes a PLD fabric including an array of memory cells configured to operate upon being programmed using the configuration data and provide user data for processing using a second set of security functions. The PLD further includes a security engine including a cryptographic circuit and an interface integration logic circuit. The logic circuit is configured to selectively couple, based on an indicator, the configuration engine or PLD fabric to the cryptographic circuit. The cryptographic circuit is configured to perform the first set or second set of security functions when coupled to the configuration engine or PLD fabric, respectively, by the logic circuit. Related systems and methods are provided.

20 Claims, 9 Drawing Sheets

CRYPTOGRAPHIC HARDWARE SHARING SYSTEMS AND METHODS

CROSS REFERENCE TO RELATED APPLICATIONS

This patent application claims priority to and the benefit of U.S. Provisional Patent Application No. 63/429,777, filed Dec. 2, 2022 and entitled "CRYPTOGRAPHIC HARDWARE SHARING SYSTEMS AND METHODS," which is incorporated herein by reference in its entirety.

TECHNICAL FIELD

The present invention relates generally to programmable logic devices and, more particularly, to cryptographic hardware sharing systems and methods.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, the user designs are synthesized and mapped into configurable resources, including by way of non-limiting example programmable logic gates, look-up tables (LUTs), embedded hardware, interconnections, and/or other types of resources, available in particular PLDs. Physical placement and routing for the synthesized and mapped user designs may then be determined to generate configuration data for the particular PLDs. The generated configuration data is loaded into configuration memory of the PLDs to implement the programmable logic gates, LUTs, embedded hardware, interconnections, and/or other types of configurable resources. Customers for PLDs often dedicate considerable resources to developing configurations for their chosen PLD type and/or capability and protecting the configuration data and protecting against subversion of a desired operation or capability tied to the chosen PLD and/or developed configuration has become of paramount importance to many customers for PLDs.

SUMMARY

In one embodiment, a PLD includes a configuration engine configured to provide configuration data for processing using a first set of security functions. The PLD further includes a PLD fabric including an array of memory cells configured to operate upon being programmed based on the configuration data and configured to provide user data for processing using a second set of security functions. The PLD further includes a security engine including a cryptographic circuit and an interface integration logic circuit. The interface integration logic circuit is configured to selectively couple, based on a security engine control indicator, the configuration engine to the cryptographic circuit or the PLD fabric to the cryptographic circuit. The cryptographic circuit is configured to perform the first set of security functions for the configuration engine when coupled to the configuration engine by the interface integration logic circuit and/or the second set of security functions for the PLD fabric when coupled to the PLD fabric by the interface integration logic circuit.

In another embodiment, a method includes selectively coupling, by an interface integration logic circuit based on a security engine control indicator, a configuration engine to a cryptographic circuit or a programmable logic device (PLD) fabric to the cryptographic circuit. The method further includes performing a first set of security functions on configuration data from the configuration engine if the cryptographic circuit is coupled to the configuration engine by the interface integration logic circuit. The PLD fabric comprises an array of memory cells programmed based on the configuration data. The method further includes performing a second set of security functions on user data from the PLD fabric if the cryptographic circuit is coupled to the PLD fabric by the interface integration logic circuit.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
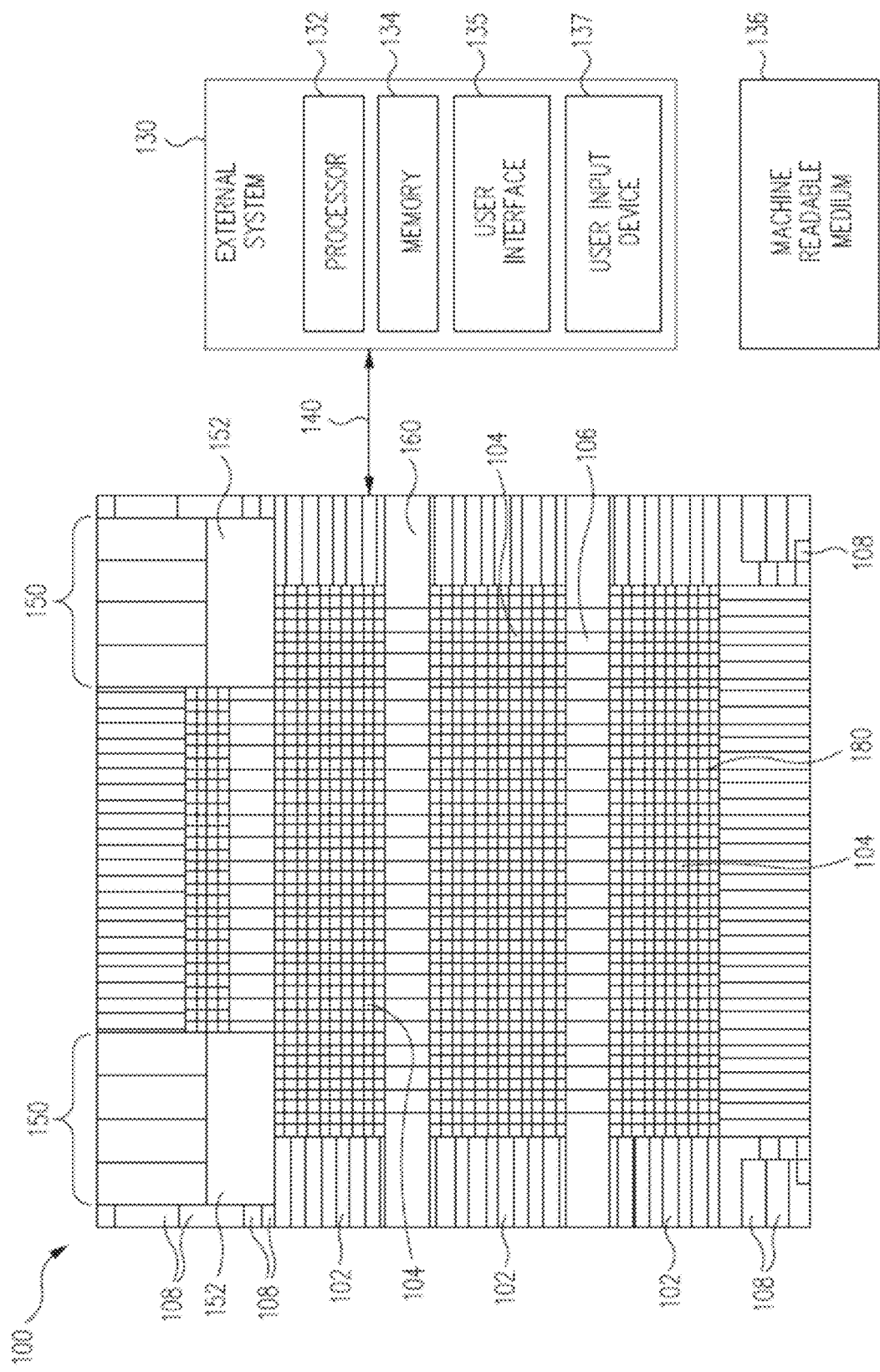
FIG. 1 illustrates a block diagram of a PLD in accordance with one or more embodiments of the present disclosure.

In accordance with embodiments disclosed herein, various techniques are provided to implement cryptographic hardware sharing between multiple entities of PLDs, such as FPGAs. In some embodiments, a PLD includes a configuration engine, a PLD fabric, an interface integration logic circuit, and a security engine whose security functions may be called/shared by the configuration engine and the PLD fabric using the interface integration logic circuit. In such embodiments, the entities of the PLD that may need to access the cryptographic hardware may include the configuration engine and the PLD fabric. In this regard, the security engine may support bitstream security as well as user security. In an aspect, bitstream security may include cryptographic authentication and confidentiality of configuration data for configuring the PLD (e.g., as part of a configuration mode of the PLD) whereas user security may include cryptographic functionality for use by customer designs (e.g., as part of a user mode of the PLD).

Cryptographic hardware (e.g., also referred to as a cryptographic circuit, a cryptographic block, a cryptographic module, a cryptographic accelerator, etc.) for bitstream security may generally be used for limited periods of time, for example during an initial PLD configuration (e.g., prior to loading the configuration data into the PLD) and during dry-runs to verify an authenticity of bitstream updates. In some aspects, bitstream security is performed during a configuration mode of the PLD and, for dry-runs, during a user mode. Cryptographic hardware for user security is generally not used during these same time periods.

As such, a single instance (e.g., a single consolidated instance, a single logical entity) of the cryptographic hardware may be used to perform bitstream security and user security by using the interface integration logic circuit to facilitate sharing of the cryptographic hardware. The interface integration logic circuit includes logic that surrounds the cryptographic hardware and provides multiple control interfaces and interconnect logic that allows data interfaces to be shared. In some aspects, the interface integration logic may be considered to be part of the security engine or separate from the security engine.

The interface integration logic circuit may include multiple control interfaces (e.g., parallel control interfaces) and time-multiplexed data interfaces may allow the cryptographic hardware to be shared between the configuration engine (e.g., for bitstream security functions) and the PLD fabric (e.g., for user security functions). In some cases, the bitstream security functions may include some of the user security functions and some functions specific to the bitstream security, and, similarly, the user security functions may include some of the bitstream security functions and some functions specific to the user security. When the configuration bitstream is loaded into the PLD fabric, the interface integration logic circuit may enable appropriate interfaces for facilitating communication between the cryptographic hardware and the PLD fabric, including allowing the PLD fabric to call functions that may be performed by the cryptographic hardware. In some aspects, while the PLD is in a user mode, utilization of the shared security engine can be dynamically switched between bitstream security and user security. This may allow mixed usage models such as encryption of user data and dry-run of authenticated and encrypted bitstreams within the same user design. As an example, for a dry-run, the user may instruct the configuration engine to fetch a new configuration bitstream and perform all or most steps, such as checking its authenticity, checking cyclic redundancy check (CRC) values, decrypting, and/or other options using the security engine, short of actually configuring the PLD with the new configuration bitstream. During the dry-run, control of the security engine is with the configuration engine, with the PLD fabric shut off from the security engine.

In some aspects, the control interfaces may implement a handshake sequence to transfer control (e.g., also referred to as ownership, access, access rights, etc.) of the security engine back and forth between the configuration engine and PLD fabric. In some aspects, interconnect for the data interfaces may include clock domain and data width conversions, which may be specific to each client interface (e.g., the configuration engine or PLD fabric). Interconnects for data interfaces may facilitate mutually exclusive access to the security engine using data multiplexers.

Sharing of the security engine by the configuration engine and the PLD fabric may have savings in power (e.g., total static power consumption) and total chip area (e.g., silicon area) compared to approaches in which each of the configuration engine and the PLD fabric has dedicated hardware (e.g., separate hardware instances) for implementing its desired security functions. In some aspects, by consolidating security functions into a shared security engine as opposed to implementing separate, dedicated security engines, the shared/consolidated security engine may be implemented with more advanced cryptographic hardware that can support multiple algorithms and key strengths and may include strong protection against side channel analysis attacks. Although the foregoing describes control of the security engine is shared between two entities (e.g., the configuration engine and the PLD fabric), in some embodiments, control/ownership of the security engine may be shared between more than two entities.

Referring now to the figures, FIG. 1 illustrates a block diagram of a PLD 100 in accordance with one or more embodiments of the present disclosure. In various embodiments, the PLD 100 may be implemented as a standalone device, for example, or may be embedded in a die that contains a system on a chip (SOC), other logic devices, and/or other integrated circuit(s). The PLD 100 (e.g., a field programmable gate array (FPGA), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)). In some cases, the PLD 100 may generally be any type of programmable device (e.g., programmable integrated circuit) with distributed configuration, which may involve loading configuration data through pins, shifting to appropriate locations in associated fabric, and configuring configuration memory cells. The PLBs may also be referred to as logic blocks, programmable functional units (PFUs), or programmable logic cells (PLCs). In an aspect, the PLBs 104 may collectively form an integrated circuit (IC) core or logic core of the PLD 100. The I/O blocks 102 provide I/O functionality (e.g., to support one or more I/O and/or memory interface standards) for the PLD 100, while the PLBs 104 provide logic functionality (e.g., LUT-based logic) for the PLD 100. Additional I/O functionality may be provided by serializer/deserializer (SERDES) blocks 150 and physical coding sublayer (PCS) blocks 152. The PLD 100 may also include hard intellectual property core (IP) blocks 160 to provide additional functionality (e.g., substantially predetermined functionality provided in hardware which may be configured with less programming than the PLBs 104).

The PLD 100 may include blocks of memory 106 (e.g., blocks of erasable programmable read-only memory (EEPROM), block static RAM (SRAM), and/or flash memory), clock-related circuitry 108 (e.g., clock sources, phase-locked loop (PLL) circuits, delay-locked loop (DLL) circuits, and/or feedline interconnects), and/or various routing resources 180 (e.g., interconnect and appropriate switching circuits to provide paths for routing signals throughout the PLD 100, such as for clock signals, data signals, control signals, or others) as appropriate. In general, the various elements of the PLD 100 may be used to perform their intended functions for desired applications, as would be understood by one skilled in the art.

For example, certain of the I/O blocks 102 may be used for programming the memory 106 or transferring information (e.g., various types of user data and/or control signals) to/from the PLD 100. Other of the I/O blocks 102 include a first programming port (which may represent a central processing unit (CPU) port, a peripheral data port, a serial peripheral interface (SPI) interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, the I/O blocks 102 may be included to receive configuration data and commands (e.g., over one or more connections) to configure the PLD 100 for its intended use and to support serial or parallel device configuration and information transfer with the SERDES blocks 150, PCS blocks 152, hard IP blocks 160, and/or PLBs 104 as appropriate. In another example, the routing resources 180 may be used to route connections between components, such as between I/O nodes of logic blocks 104. In some embodiments, such routing resources may include programmable elements (e.g., nodes where multiple routing resources intersect) that may be used to selectively form a signal path for a particular connection between components of the PLD 100.

It should be understood that the number and placement of the various elements are not limiting and may depend upon the desired application. For example, various elements may not be required for a desired application or design specification (e.g., for the type of programmable device selected). Furthermore, it should be understood that the elements are illustrated in block form for clarity and that various elements would typically be distributed throughout the PLD 100, such as in and between the PLBs 104, hard IP blocks 160, and routing resources 180 to perform their conventional functions (e.g., storing configuration data that configures the PLD 100 or providing interconnect structure within the PLD 100). For example, the routing resources 180 may be used for internal connections within each PLB 104 and/or between different PLBs 104. It should also be understood that the various embodiments disclosed herein are not limited to programmable logic devices, such as the PLD 100, and may be applied to various other types of programmable devices, as would be understood by one skilled in the art.

An external system 130 may be used to create a desired user configuration or design of the PLD 100 and generate corresponding configuration data to program (e.g., configure) the PLD 100. For example, to configure the PLD 100, the system 130 may provide such configuration data to one or more of the I/O blocks 102, PLBs 104, SERDES blocks 150, and/or other portions of the PLD 100. In this regard, the external system 130 may include a link 140 that connects to a programming port (e.g., SPI, JTAG) of the PLD 100 to facilitate transfer of the configuration data from the external system 130 to the PLD 100. As a result, the I/O blocks 102, PLBs 104, various of the routing resources 180, and any other appropriate components of the PLD 100 may be configured to operate in accordance with user-specified applications.

In the illustrated embodiment, the system 130 is implemented as a computer system. In this regard, the system 130 includes, for example, one or more processors 132 that may be configured to execute instructions, such as software instructions, provided in one or more memories 134 and/or stored in non-transitory form in one or more non-transitory machine readable media 136 (e.g., which may be internal or external to the system 130). For example, in some embodiments, the system 130 may run PLD configuration software, such as Lattice Diamond System Planner software available from Lattice Semiconductor Corporation to permit a user to create a desired configuration and generate corresponding configuration data to program the PLD 100. In this regard, in some cases, the system 130 and/or other external/remote system may be used for factory programming or remote programming (e.g., remote updating) of one or more PLDs (e.g., through a network), such as the PLD 100.

The configuration data may alternatively or in addition be stored on the PLD 100 (e.g., stored in a memory located within the PLD 100) and/or a separate/discrete memory of a system including the PLD 100 and the separate/discrete memory (e.g., a system within which the PLD 100 is operating). In some embodiments, the memory 106 of the PLD 100 may include non-volatile memory (e.g., flash memory) utilized to store the configuration data generated and provided to the memory 106 by the external system 130. During configuration of the PLD 100, the non-volatile memory may provide the configuration data via configuration paths and associated data lines to configure the various portions (e.g., I/O blocks 102, PLBs 104, SERDES blocks 150, routing resources 180, and/or other portions) of the PLD 100. In some cases, the configuration data may be stored in non-volatile memory external to the PLD 100 (e.g., on an external hard drive such as the memories 134 in the system 130). During configuration, the configuration data may be provided (e.g., loaded) from the external non-volatile memory into the PLD 100 to configure the PLD 100.

The system 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of the PLD 100. In some embodiments, user interface 135 may be adapted to display a netlist, a component placement, a connection routing, hardware description language (HDL) code, and/or other final and/or intermediary representations of a desired circuit design, for example.

Figure 2:
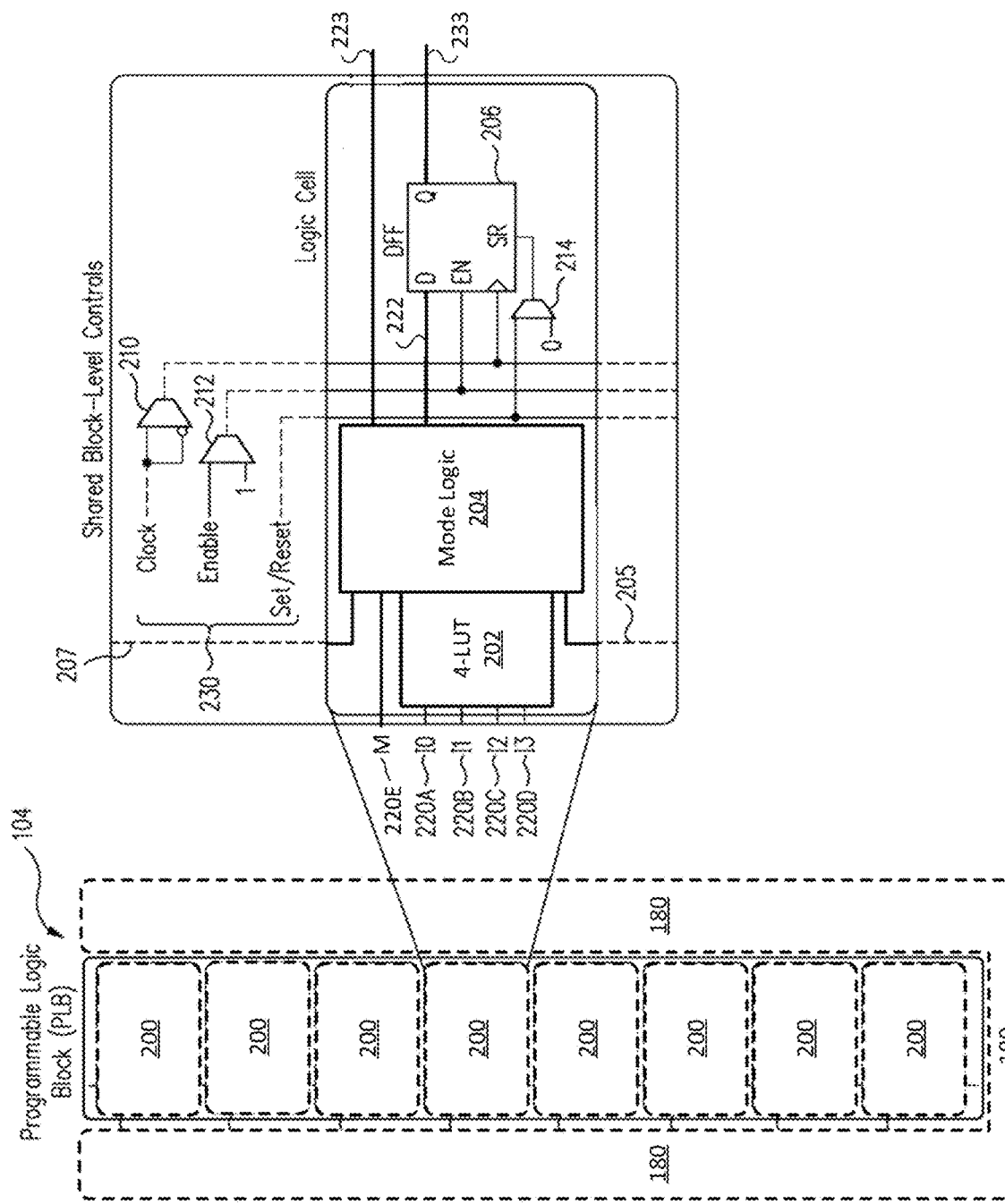
FIG. 2 illustrates a block diagram of a logic block of a PLD in accordance with one or more embodiments of the present disclosure.

FIG. 2 illustrates a block diagram of a logic block 104 of the PLD 100 in accordance with one or more embodiments of the present disclosure. As discussed, the PLD 100 includes a plurality of logic blocks 104 including various components to provide logic and arithmetic functionality. In the example embodiment shown in FIG. 2, the logic block 104 includes a plurality of logic cells 200, which may be interconnected internally within logic block 104 and/or externally using the routing resources 180. For example, each logic cell 200 may include various components such as: a lookup table (LUT) 202, a mode logic circuit 204, a register 206 (e.g., a flip-flop or latch), and various programmable multiplexers (e.g., programmable multiplexers 212 and 214) for selecting desired signal paths for the logic cell 200 and/or between logic cells 200. In this example, the LUT 202 accepts four inputs 220A-220D, which makes it a four-input LUT (which may be abbreviated as "4-LUT" or "LUT4") that can be programmed by configuration data for the PLD 100 to implement any appropriate logic operation having four inputs or less. The mode logic 204 may include various logic elements and/or additional inputs, such as an input 220E, to support the functionality of various modes for the logic cell 200 (e.g., including various processing and/or functionality modes). The LUT 202 in other examples may be of any other suitable size having any other suitable number of inputs for a particular implementation of a PLD. In some embodiments, different size LUTs may be provided for different logic blocks 104 and/or different logic cells 200.

An output signal 222 from the LUT 202 and/or the mode logic 204 may in some embodiments be passed through the register 206 to provide an output signal 233 of the logic cell

200. In various embodiments, an output signal 223 from the LUT 202 and/or the mode logic 204 may be passed to the output 223 directly, as shown. Depending on the configuration of multiplexers 210-214 and/or the mode logic 204, the output signal 222 may be temporarily stored (e.g., latched) in the register 206 according to control signals 230. In some embodiments, configuration data for the PLD 100 may configure the output 223 and/or 233 of the logic cell 200 to be provided as one or more inputs of another logic cell 200 (e.g., in another logic block or the same logic block) in a staged or cascaded arrangement (e.g., comprising multiple levels) to configure logic and/or other operations that cannot be implemented in a single logic cell 200 (e.g., operations that have too many inputs to be implemented by a single LUT 202). Moreover, logic cells 200 may be implemented with multiple outputs and/or interconnections to facilitate selectable modes of operation.

The mode logic circuit 204 may be utilized for some configurations of the PLD 100 to efficiently implement arithmetic operations such as adders, subtractors, comparators, counters, or other operations, to efficiently form some extended logic operations (e.g., higher order LUTs, working on multiple bit data), to efficiently implement a relatively small RAM, and/or to allow for selection between logic, arithmetic, extended logic, and/or other selectable modes of operation. In this regard, the mode logic circuits 204, across multiple logic cells 202, may be chained together to pass carry-in signals 205 and carry-out signals 207, and/or other signals (e.g., output signals 222) between adjacent logic cells 202. In the example of FIG. 2, the carry-in signal 205 may be passed directly to the mode logic circuit 204, for example, or may be passed to the mode logic circuit 204 by configuring one or more programmable multiplexers. In some cases, the mode logic circuits 204 may be chained across multiple logic blocks 104.

The logic cell 200 illustrated in FIG. 2 is merely an example, and logic cells 200 according to different embodiments may include different combinations and arrangements of PLD components. Also, although FIG. 2 illustrates a logic block 104 having eight logic cells 200, a logic block 104 according to other embodiments may include fewer logic cells 200 or more logic cells 200. Each of the logic cells 200 of a logic block 104 may be used to implement a portion of a user design implemented by the PLD 100. In this regard, the PLD 100 may include many logic blocks 104, each of which may include logic cells 200 and/or other components which are used to collectively implement the user design.

Figure 3:
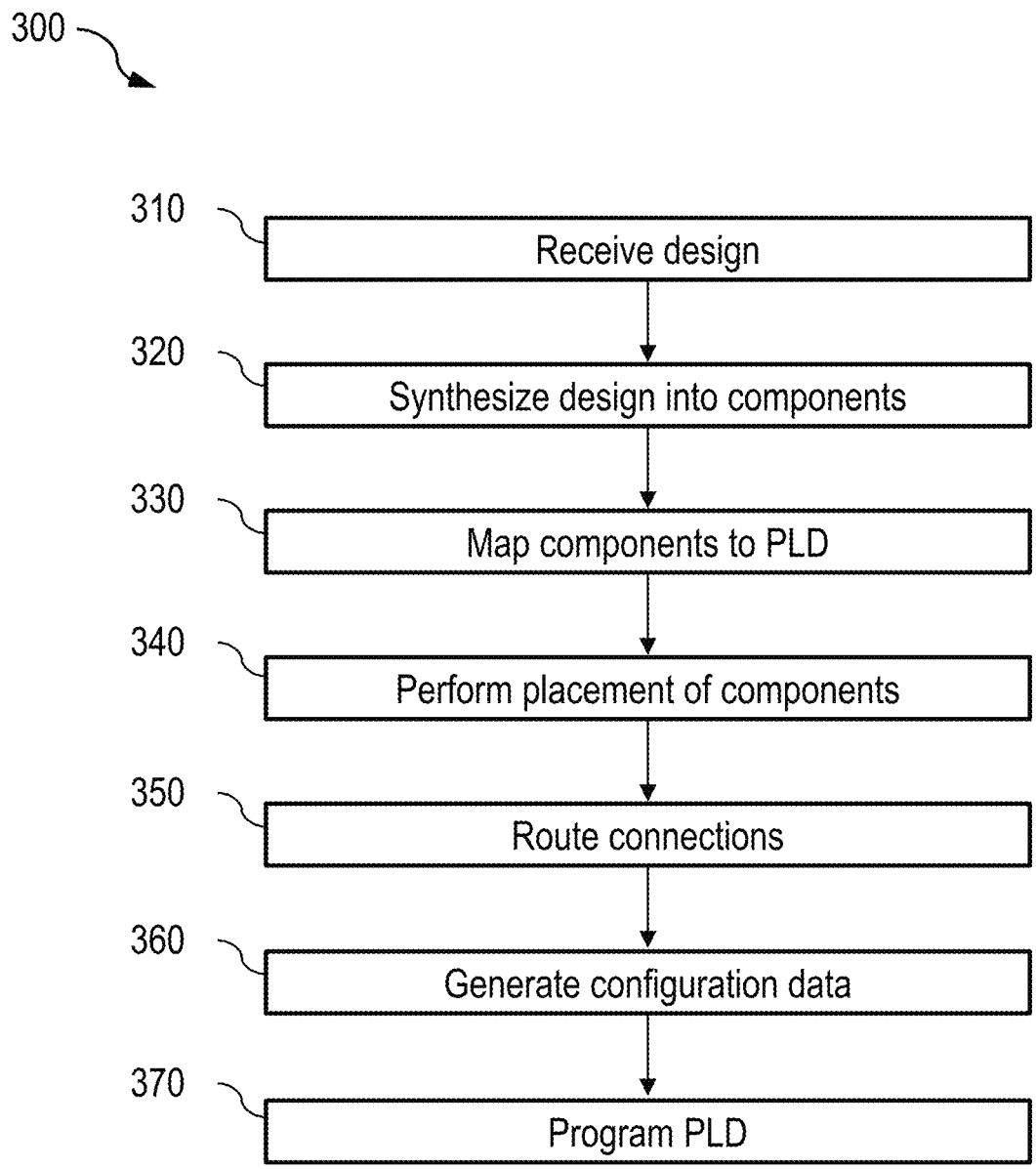
FIG. 3 illustrates a design process for a PLD in accordance with one or more embodiments of the present disclosure.

FIG. 3 illustrates a design process 300 for a PLD in accordance with one or more embodiments of the present disclosure. For example, the process of FIG. 3 may be performed by system 130 running Lattice Diamond software to configure the PLD 100. In some embodiments, the various files and information referenced in FIG. 3 may be stored, for example, in one or more databases and/or other data structures in the memory 134, the machine readable medium 136, and/or other storage.

In operation 310, the system 130 receives a user design that specifies the desired functionality of the PLD 100. For example, the user may interact with the system 130 (e.g., through the user input device 137 and hardware description language (HDL) code representing the design) to identify various features of the user design (e.g., high level logic operations, hardware configurations, I/O and/or SERDES operations, and/or other features). In some embodiments, the user design may be provided in a RTL description (e.g., a gate level description). The system 130 may perform one or more rule checks to confirm that the user design describes a valid configuration of PLD 100. For example, the system 130 may reject invalid configurations and/or request the user to provide new design information as appropriate.

In operation 320, the system 130 synthesizes the design to create a netlist (e.g., a synthesized RTL description) identifying an abstract logic implementation of the user design as a plurality of logic components (e.g., also referred to as netlist components). In some embodiments, the netlist may be stored in Electronic Design Interchange Format (EDIF) in a Native Generic Database (NGD) file.

In some embodiments, synthesizing the design into a netlist in operation 320 may involve converting (e.g., translating) the high-level description of logic operations, hardware configurations, and/or other features in the user design into a set of PLD components (e.g., logic blocks 104, logic cells 200, and other components of the PLD 100 configured for logic, arithmetic, or other hardware functions to implement the user design) and their associated interconnections or signals. Depending on embodiments, the converted user design may be represented as a netlist.

In some embodiments, synthesizing the design into a netlist in operation 320 may further involve performing an optimization process on the user design (e.g., the user design converted/translated into a set of PLD components and their associated interconnections or signals) to reduce propagation delays, consumption of PLD resources and routing resources, and/or otherwise optimize the performance of the PLD when configured to implement the user design. Depending on embodiments, the optimization process may be performed on a netlist representing the converted/translated user design. Depending on embodiments, the optimization process may represent the optimized user design in a netlist (e.g., to produce an optimized netlist).

In some embodiments, the optimization process may include optimizing routing connections identified in a user design. For example, the optimization process may include detecting connections with timing errors in the user design, and interchanging and/or adjusting PLD resources implementing the invalid connections and/or other connections to reduce the number of PLD components and/or routing resources used to implement the connections and/or to reduce the propagation delay associated with the connections. In some cases, wiring distances may be determined based on timing.

In operation 330, the system 130 performs a mapping process that identifies components of the PLD 100 that may be used to implement the user design. In this regard, the system 130 may map the optimized netlist (e.g., stored in operation 320 as a result of the optimization process) to various types of components provided by the PLD 100 (e.g., logic blocks 104, logic cells 200, embedded hardware, and/or other portions of the PLD 100) and their associated signals (e.g., in a logical fashion, but without yet specifying placement or routing). In some embodiments, the mapping may be performed on one or more previously-stored NGD files, with the mapping results stored as a physical design file (e.g., also referred to as an NCD file). In some embodiments, the mapping process may be performed as part of the synthesis process in operation 320 to produce a netlist that is mapped to PLD components.

In operation 340, the system 130 performs a placement process to assign the mapped netlist components to particular physical components residing at specific physical locations of the PLD 100 (e.g., assigned to particular logic cells 200, logic blocks 104, clock-related circuitry 108, routing resources 180, and/or other physical components of PLD 100), and thus determine a layout for the PLD 100. In some embodiments, the placement may be performed in memory on data retrieved from one or more previously-stored NCD files, for example, and/or on one or more previously-stored NCD files, with the placement results stored (e.g., in the memory 134 and/or the machine readable medium 136) as another physical design file.

In operation 350, the system 130 performs a routing process to route connections (e.g., using the routing resources 180) among the components of the PLD 100 based on the placement layout determined in operation 340 to realize the physical interconnections among the placed components. In some embodiments, the routing may be performed in memory on data retrieved from one or more previously-stored NCD files, for example, and/or on one or more previously-stored NCD files, with the routing results stored (e.g., in the memory 134 and/or the machine readable medium 136) as another physical design file.

In various embodiments, routing the connections in operation 350 may further involve performing an optimization process on the user design to reduce propagation delays, consumption of PLD resources and/or routing resources, and/or otherwise optimize the performance of the PLD when configured to implement the user design. The optimization process may in some embodiments be performed on a physical design file representing the converted/translated user design, and the optimization process may represent the optimized user design in the physical design file (e.g., to produce an optimized physical design file).

Changes in the routing may be propagated back to prior operations, such as synthesis, mapping, and/or placement, to further optimize various aspects of the user design.

Thus, following operation 350, one or more physical design files may be provided which specify the user design after it has been synthesized (e.g., converted and optimized), mapped, placed, and routed (e.g., further optimized) for the PLD 100 (e.g., by combining the results of the corresponding previous operations). In operation 360, the system 130 generates configuration data for the synthesized, mapped, placed, and routed user design. In various embodiments, such configuration data may be encrypted and/or otherwise secured as part of such generation process. In operation 370, the system 130 configures/programs the PLD 100 with the configuration data (e.g., a configuration) into the PLD 100 over the connection 140. Such configuration may be provided in an encrypted, signed, or unsecured/unauthenticated form dependent on application/requirements.

Figure 4:
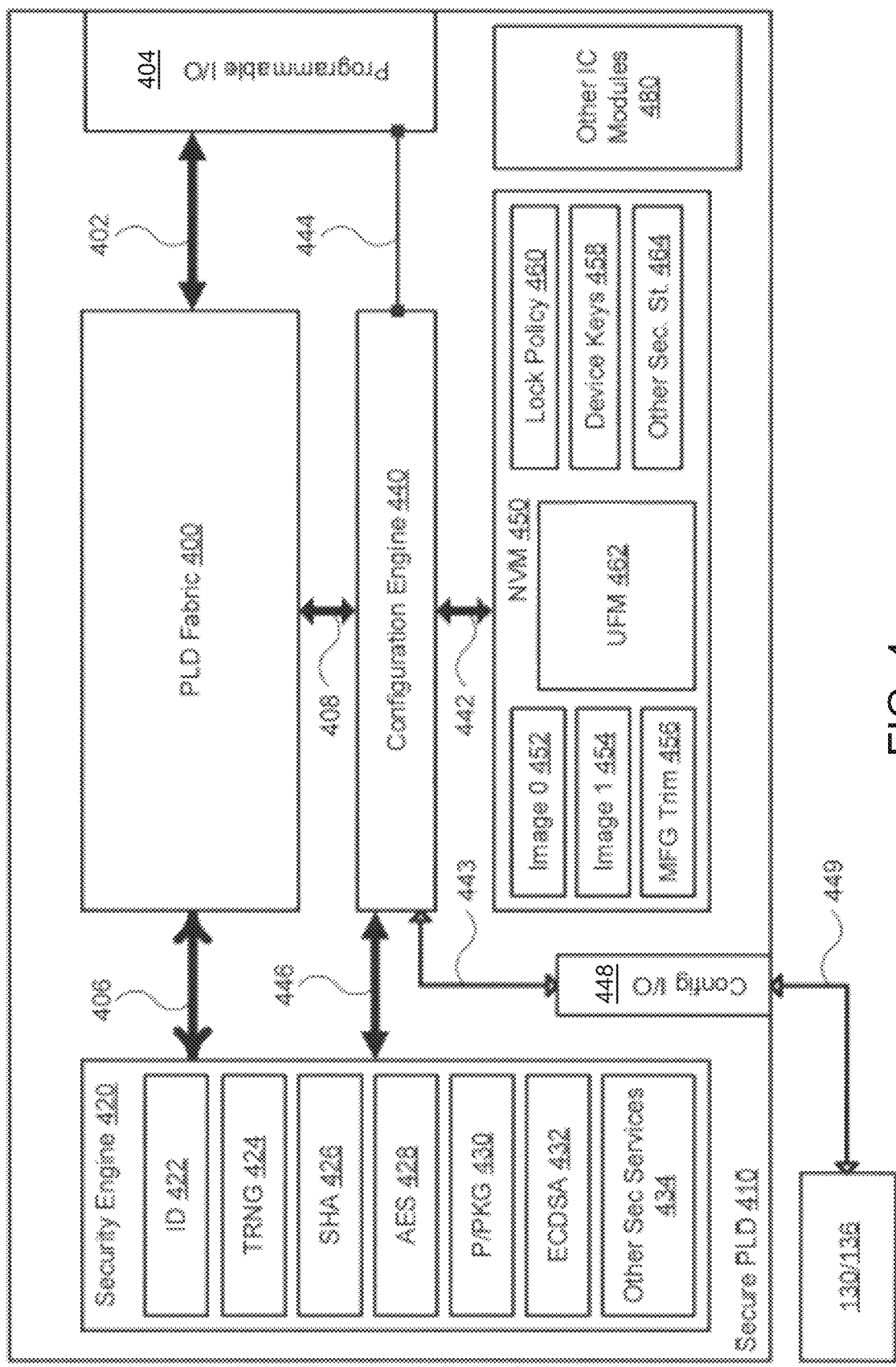
FIG. 4 illustrates a block diagram of a secure PLD in accordance with one or more embodiments of the present disclosure.

FIG. 4 illustrates a block diagram of a secure PLD 410 in accordance with one or more embodiments of the present disclosure. In various embodiments, the secure PLD 410 may be implemented by elements similar to those described with respect to the PLD 100 of FIG. 1, but with additional configurable and/or hard IP elements configured to facilitate operation of the secure PLD 410 in a trusted computing application and/or architecture. In particular, the secure PLD 410 may include a PLD fabric 400 linked by various buses to a security engine 420, a configuration engine 440, an NVM 450, a programmable I/O 404, and/or other IC modules 480. In general, the PLD fabric 400 may be implemented by any of the various elements described with respect to the PLD 100 and may be configured using a design process similar to the process 300 described in relation to FIG. 3 to generate and program the PLD fabric 400 according to a desired configuration. More specifically, the secure PLD 410 may be configured to use various identified hard IP elements identified in FIG. 4 to receive, decrypt, authenticate, and/or verify a received configuration prior to programming the PLD fabric 400 according to the received configuration.

The security engine 420 may be at least partially implemented as a hard IP resource configured to provide various security functions for use by the PLD fabric 400 and/or configuration engine 440. In the embodiment shown in FIG. 4, the security engine 420 includes a device ID 422 (e.g., a 64-bit unique and device specific ID), a true random number generator (TRNG) 424, a secure hash algorithm (SHA) service 426 (e.g., an SHA-256/384, SHA-2, and/or SHA-3 service), an advanced encryption standard (AES) service 428 (e.g., an AES 256/128 encrypt/decrypt service), a public/private key pair generator (P/PKG) 430, an elliptic curve digital signature algorithm (ECDSA) authentication service 432 (e.g., an ECDSA256 or ECDSA384 service), and/or other security services 434.

The security engine 420 may be communicatively linked to the PLC fabric 400 over a limited bus 406 and to the configuration engine 440 over a secure bus 446. In general, the limited bus 406 may be configured to allow the PLD fabric 400 to access a limited set of security functions hosted by the security engine 420 and/or to access such security functions in a limited manner, such as disallowing access to a private key of a public/private key pair generated by the P/PKG 430. By contrast, the secure bus 446 may be configured to allow the configuration engine 440 to access and/or modify all security functions, data, and/or configurations of the security engine 420. In general, either or both the limited bus 406 and secure bus 446 may be configured to provide encrypted and/or otherwise secured communication between the security engine 420 and other elements of the secure PLD 410.

The configuration engine 440 may be at least partially implemented as a hard IP resource configured to manage the configurations of and/or communications amongst the various elements of the secure PLD 410. For example, the configuration engine 440 may be configured to receive an encrypted/secured configuration of the PLD fabric 400 from the external system 130/machine readable medium 136 over a configuration I/O 448, use security functions of the security engine 420 to authenticate and/or decrypt such configuration, store the authenticated and/or decrypted configuration in the NVM 450, soft or hard lock the portions of the NVM 450 corresponding to the stored configuration, tag the stored configuration as authenticated and/or verified bootable, and/or program the PLD fabric 400 according to the authenticated, decrypted, verified, and/or locked configuration, as described herein. In further embodiments, the configuration engine 440 may be configured to configure at least a portion of the programmable I/O 404 (e.g., to enable and/or disable at least portions of the programmable I/O 404) over the configuration port 444, as shown.

More generally, the configuration engine 440 may be configured to manage or control configurations of elements of the secure PLD 410, lock statuses of elements of the secure PLD 410, boot of the PLD fabric 400, and flow control throughout the secure PLD 410. For example, the configuration engine 440 may be configured to soft lock or unlock or hard lock any one or portion of buses 408, 442, 443, 446, for example, and/or to soft lock or unlock or hard lock any portion of sector of NVM 450. In a default unlocked configuration, buses 408, 442, and 446 may be implemented as secure buses similar in function to the secure bus 446. An external access bus 443 to the configuration I/O 448 may be implemented according to one or more of a JTAG, I2C, SPI, and/or other external access bus or protocol, for example, configured to provide lockable/unlockable access to and/or from the external system 130/machine readable medium 136. In a particular embodiment, the secure bus 408 may be implemented according to a wishbone bus/interface.

The NVM 450 may be implemented as a hard IP resource configured to provide securable non-volatile storage of data used to facilitate secure operation of the secure PLD 410. For example, the NVM 450 may include a lock policy 460 corresponding to memory locations in the NVM 450 indicating a lock status of data stored in the NVM 450. The contents of the lock policy 460 may be transferred to shadow registers within the configuration engine 440 upon power on of the secure PLD 410, for example, to allow such contents to be modified dynamically by the configuration engine 440 and/or the PLD fabric 400, depending on settings/lock statuses in the lock policy 460. In general, the lock status of a particular resource indicates read, write/program, and/or erase access for that resource, as against the PLD fabric 400, configuration I/O 448/external access bus 443, and/or other elements of the secure PLD 410.

As described herein, "soft" lock refers to a read, write, and/or erase access status of a bus/port or memory location in the NVM 450 that can be programmatically enabled or disabled by the PLD fabric 400 and/or across an external access bus 443 to granularly allow or disallow read, write, and/or erase access to the corresponding resource. "Hard" lock refers to a read, write, and/or erase access status of a bus/port or memory location in the NVM 450 that can be programmatically enabled across the external access bus 443, but that cannot be enabled or disabled by the PLD fabric 400 and that cannot be disabled across the external access bus 443. In various embodiments, assertion of a hard lock is generally one-way and eliminates the ability of the PLD fabric 400 and/or external access bus 443 to further modify the lock status of all secured resources within the secure PLD 410. In some embodiments, such locking scheme may be implemented by four bits for each resource (e.g., bus/port or sector of memory within the NVM 450), one bit each for hard lock enable, read lock enable, write lock enable, and erase lock enable.

As shown in the embodiment illustrated by FIG. 4, the NVM 450 may include multiple differentiated lockable sectors, each of which may have its own lock status. Such lockable sectors may include, for example, one or more of a first configuration image sector 452, a second configuration image sector 454, a manufacturer-specified trim sector 456, a device key sector 458 (e.g., an AES key sector and a separate public key/key pair sector), a lock policy selector 460, a user flash memory (UFM) sector 462, and/or other defined securable storage sectors 464, as shown. In some embodiments, the UFM sector 462 may be further differentiated into subsectors each of which may have its own lock status. The lock policy sector 460 may store the lock status of each sector of the NVM 450, for example, including its own lock status. First and second configuration image sectors 452-454 may each store a configuration for the PLD fabric 400, for example, and may further be tagged by version and/or date and as pre-authenticated so as to allow them to be selected (e.g., based on version or date) and used to program the PLD fabric without performing an authentication process. The trim sector 456 may be used to store manufacture trim and/or other data specific to a particular secure PLD 410, for example, such as a modifiable customer-specific ordering part number derived from the device ID 422 and a general customer ID number, as described herein. The device key sectors 458 may be used to store encryption/decryption keys, and/or other security keys specific to a particular secure PLD 410. The lock policy sector 460 may be configured to store lock statuses for resources of the NVM 450, the configuration engine 440, the configuration I/O 448, and/or other elements of the secure PLD 410. The UFM sector 462 may be used to store user data generally accessible by the PLD fabric 400, such as configurations or application-specific security keys, certificates, and/or other secure(d) user data. Any one or more individual elements, portions, or sectors of the NVM 450 may be implemented as configurable memory, for example, or one time programmable (OTP) memory.

The programmable I/O 404 may be implemented as at least partially configurable resources configured to provide or support a communication link between the PLD fabric 400 and an external controller, memory, and/or other device, for example, across a bus 402 (e.g., a bus configured to link portions of the PLD fabric 400 to the programmable I/O 404). In some embodiments, the bus 402 and/or the programmable I/O 404 may be integrated with the PLD fabric 400. The configuration I/O 448 may be implemented as hard IP resources configured to support one or more external bus interfaces and/or protocols 449 to support communications with the external system 130/machine readable medium 136, as described herein. In some embodiments, the configuration I/O 448 and/or the bus 443 may be integrated with the configuration engine 440. More generally, the configuration I/O 448 and/or the bus 443 may be integrated with the configuration engine 440. More generally, one or more elements of the secure PLD 410 shown as separate in FIG. 4 may be integrated with and/or within each other. Other IC modules 480 may be implemented as hard and/or configurable IP resources configured to facilitate operation of the secure PLD 410.

In one or more embodiments, a PLD (e.g., FPGA device) includes a configuration engine (e.g., the configuration engine 440), a PLD fabric (e.g., the PLD fabric 400), an interface integration logic circuit, and a security engine (e.g., the security engine 420) whose security functions may be shared by the configuration engine and the PLD fabric using the interface integration logic circuit. In this regard, the security engine may support bitstream security as well as user security. In an aspect, bitstream security may include cryptographic authentication and confidentiality of configuration data for configuring the PLD whereas user security may include cryptographic functionality for use by customer designs. Sharing of the security engine by the configuration engine and the PLD fabric may have savings in power and chip area (e.g., silicon area) compared to approaches in which each of the configuration engine and the PLD fabric has dedicated hardware for implementing its desired security functions. In some aspects, by consolidating security functions into a shared security engine as opposed to implementing separate, dedicated security engines, the shared security engine may be implemented with more advanced cryptographic hardware that can support multiple algorithms and key strengths and may include strong protection against side channel analysis attacks. Although the disclosure generally describes control of the security engine as being shared between two entities (e.g., the configuration engine and the PLD fabric), in some embodiments, the control of the security engine may be shared between more than two entities.

Figure 5:
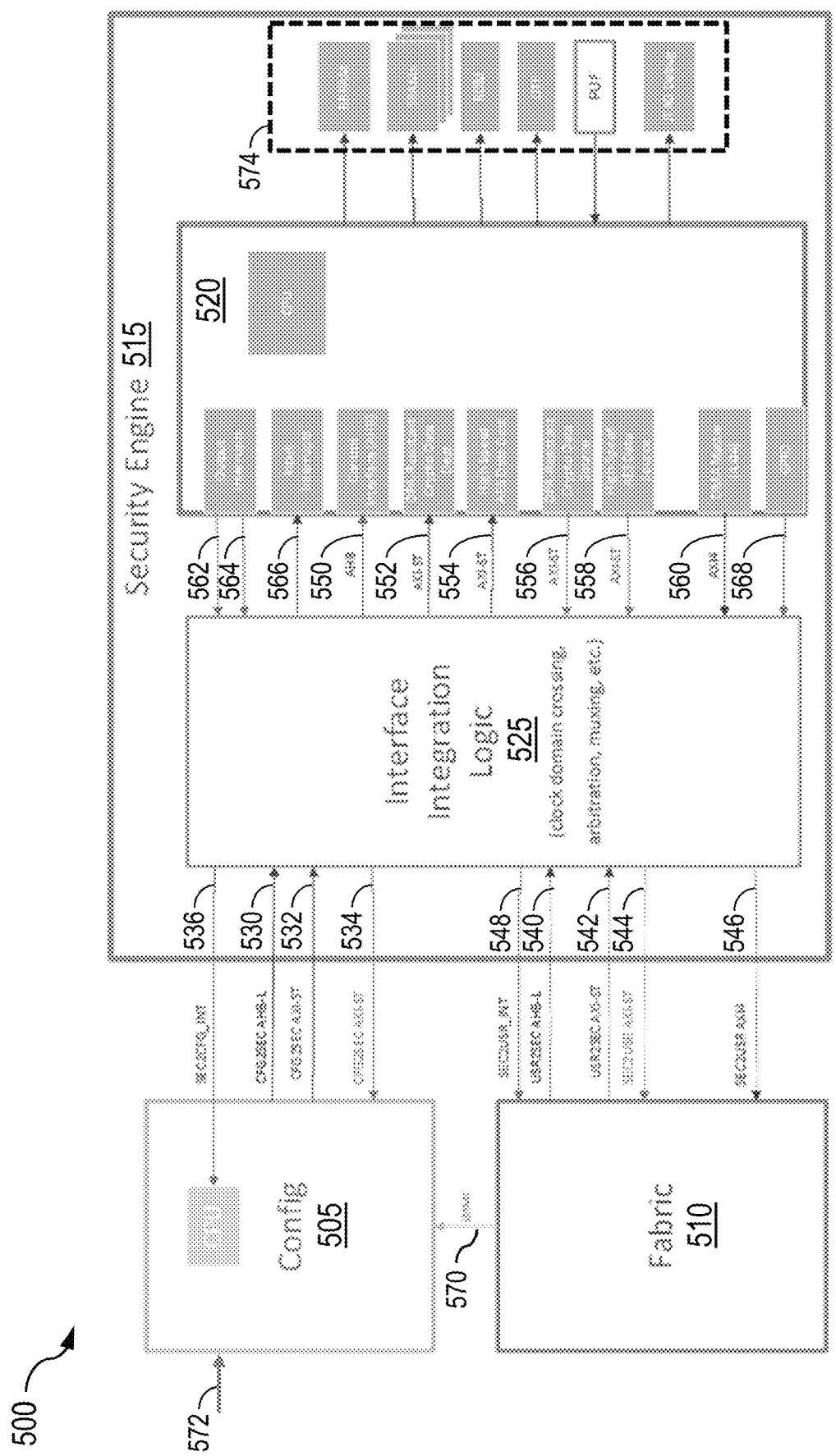
FIG. 5 illustrates a block diagram of a PLD for facilitating shared cryptographic hardware in accordance with one or more embodiments of the present disclosure.

FIG. 5 illustrates a block diagram of a PLD 500 for facilitating shared cryptographic hardware in accordance with one or more embodiments of the present disclosure.

The description of FIG. 4 generally applies to FIG. 5, with examples of differences and other description provided herein.

The PLD 500 includes a configuration engine 505, a PLD fabric 510, a security engine 515 shared by (e.g., accessible by) the configuration engine 505 and the PLD fabric 510, and various interfaces for facilitating communication between the configuration engine 505, the PLD fabric 510, and the security engine 515. The security engine 515 includes a cryptographic hardware 520 (e.g., also referred to as a cryptographic circuit, etc.) for performing functions associated with bitstream security and user security and an interface integration logic circuit 525 for facilitating sharing/access of the cryptographic block 520 by the configuration engine 505 and the PLD fabric 510.

The interface integration logic circuit 525 may include a mailbox(es), clock domain crossings, multiplexing, arbitration (e.g., for managing control of the security engine), and/or other functionality for facilitating sharing of the cryptographic block 520. An example of the interface integration logic circuit 525 is described with respect to FIG. 6.

The configuration engine 505 may receive configuration data (e.g., as part of a configuration bitstream) from an external source via a configuration interface 572. The configuration data may be used to program configuration memory cells of the PLD fabric 510. The configuration engine 505 may communicate with the security engine 515 using a control interface 530, a data output interface 532 for sending data to the security engine 515, a data input interface 534 for receiving data from the security engine 515, and an interrupt interface 536 for receiving interrupts from the security engine 515. As an example, the control interface 530 may include an advanced high-performance bus—lite (denoted, for example, as AHBL or AHB-L) interface, the data output interface 532 may include an advanced extensible interface-stream (denoted, for example, as AXI-ST, AXI-S, or AXIS) interface, and/or the data input interface 534 may include an AXI-ST interface.

The configuration engine 505 may communicate with a mailbox (not explicitly shown) via the control interface 530 to facilitate use of the cryptographic hardware 520 by the configuration engine 505. The mailbox may be implemented as part of the interface integration logic circuit 525 and/or the cryptographic hardware 520. For example, when the configuration engine 505 needs to decrypt data, the configuration engine 505 may provide, via the control interface 530 to the mailbox, information including a source address (e.g., an address location) of the data to be decrypted by the cryptographic hardware 520, a destination address to store the decrypted data, a key to use for the decryption, a mode of operation (e.g., configuration mode or user mode), and/or other parameters. In some cases, keys used for the configuration mode may be different from keys used for the user mode. With the information from the configuration engine 505 (e.g., as provided to the mailbox), the security engine 515 may obtain the data to be decrypted from the source address, generate the decrypted data, and transmit the decrypted data according to the destination address. In some cases, the data to be decrypted and the decrypted data may be communicated via appropriate data interfaces, such as the data output interface 532 and the data input interface 534.

The PLD fabric 510 may communicate with the security engine 515 using a control interface 540, a data output interface 542 for sending data to the security engine 515, data input interfaces 544 and 546 for receiving data from the security engine 515, and an interrupt interface 548 for receiving interrupts from the security engine 515. As an example, the control interface 540 may include an AHBL interface, the data output interface 542 may include an AXI-ST interface, the data input interface 544 may include an AXI-ST interface, and/or the data input interface 546 may include an AXI interface.

Similar to the configuration engine 505, the PLD fabric 510 may communicate with a mailbox (not explicitly shown) via the control interface 540 to facilitate use of the cryptographic hardware 520 by the PLD fabric 510. The mailbox may be implemented as part of the interface integration logic circuit 525 and/or the cryptographic hardware 520. For example, when the PLD fabric 510 needs to encrypt data, the PLD fabric 510 may provide, via the control interface 540 to the mailbox, information including a source address (e.g., an address location on the PLD fabric 510) of the data to be encrypted by the cryptographic hardware 520 to obtain encrypted data, a destination address to store the encrypted data, a key to use for the encryption, a mode of operation (e.g., configuration mode or user mode), and/or other parameters. In some cases, keys used for the configuration mode may be different from keys used for the user mode. With the information from the PLD fabric 510 (e.g., as provided to the mailbox), the security engine 515 obtains the data to be encrypted from the source address, generates the encrypted data, and transmit the encrypted data back to the PLD fabric 510 according to the destination address. In some cases, the data to be encrypted and the encrypted data may be communicated via appropriate data interfaces, such as the data output interface 542 and the data input interfaces 544 and 546.

The security engine 515 may communicate with the configuration engine 505 and the PLD fabric 510 using a control interface 550, data input interfaces 552 and 554, data output interfaces 556, 558, and 560, and interrupt interfaces 562, 564, 566, and 568. Data communicated between the security engine 515 and the configuration engine 505 and the PLD fabric 510 may be relayed onto one or more appropriate control interfaces, data input and/or output interfaces, and/or interrupt interfaces via the interface integration logic circuit 525. For example, signals transmitted by the configuration engine 505 on the control interface 530 and/or by the PLD fabric 510 on the control interface 540 may be relayed via the interface integration logic 525 on the control interface 550 to the cryptographic hardware 520 for processing. Similarly, data may be routed between the data output interfaces 532 and 542 and the data input interfaces 552 and/or 554, between the data input interfaces 534 and 544 and the data output interfaces 534 and/or 544, between the data input interface 546 and the data output interface 560, and so forth.

The security engine 515 includes additional blocks 574 that perform various typical functionality. The additional blocks 574 include, for example, battery-backed random access memory (BB RAM), static RAM, read-only memory (ROM), one-time-programmable (OTP) device, physical unclonable functions (PUFs), and JTAG debug. It is noted that in some cases one or more, or all, of the additional blocks 574 may be implemented inside the cryptographic hardware 520. Implementation of the additional blocks 574 is generally a design choice.

To facilitate sharing of the security engine 515 (e.g., the cryptographic hardware 520 of the security engine 515), the configuration engine 505 and the PLD fabric 510 may have control (e.g., also referred to as ownership, access rights, or usage rights) of the security engine 515. The cryptographic hardware 520 of the security engine 515 may be used by whichever of the configuration engine 505 or the PLD fabric 510 currently has control of the security engine 515. In some embodiments, the configuration engine 505 may initially have control of the security engine 515. The PLD fabric 510 may use a control request interface 570 to request a transfer (e.g., temporary transfer) of control of the security engine 515 from the configuration engine 505 to the PLD fabric 510. In an aspect, the control request interface 570 may be a memory mapped interface. In an aspect, a control transfer may be referred to as an ownership transfer or a handoff/handshake sequence to transfer control/ownership.

Figure 6:
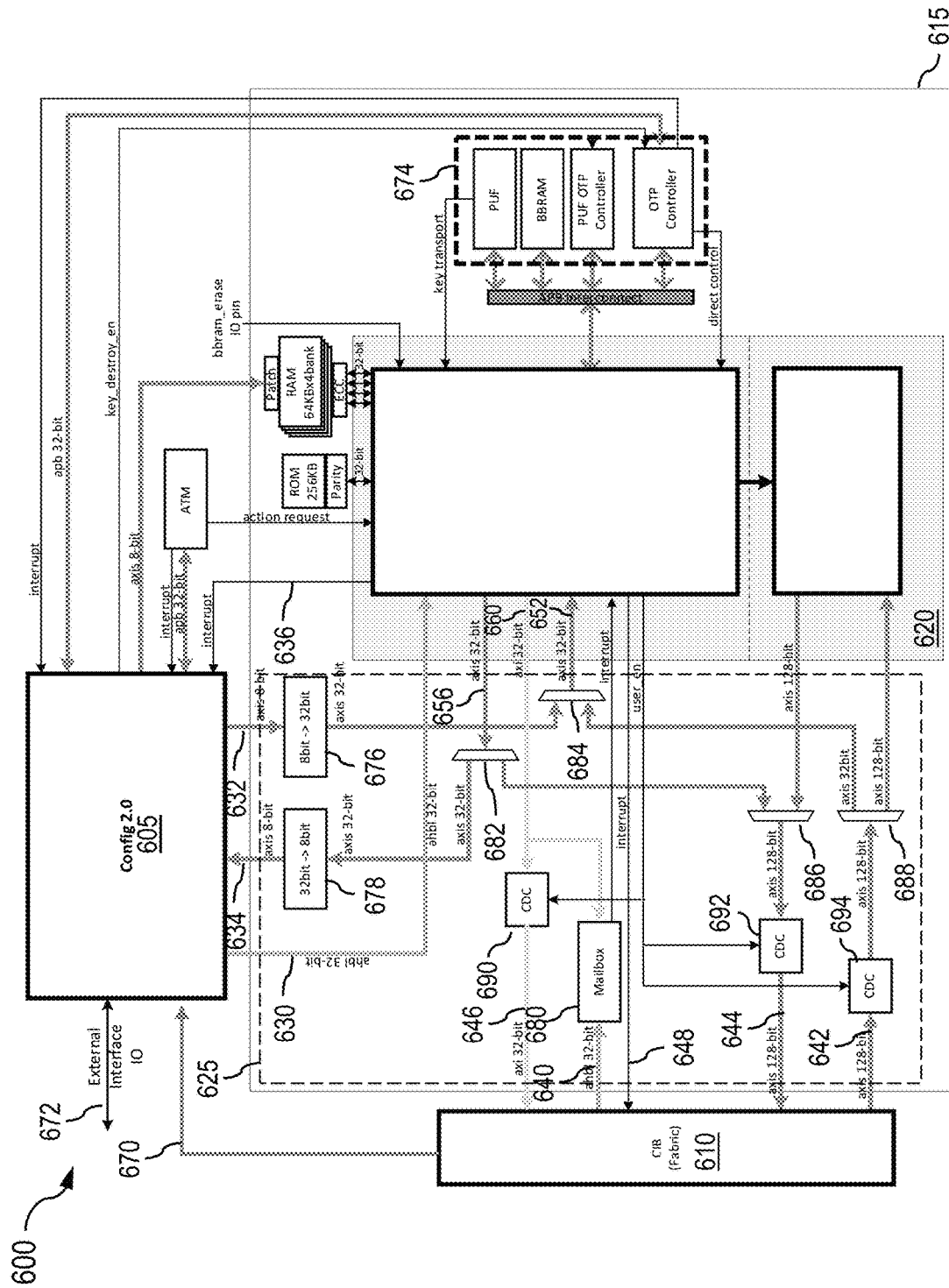
FIG. 6 illustrates an example of a PLD for facilitating shared cryptographic hardware in accordance with one or more embodiments of the present disclosure.

FIG. 6 illustrates an example of a PLD 600 for facilitating shared cryptographic hardware in accordance with one or more embodiments of the present disclosure. The PLD 600 includes a configuration engine 605, a PLD fabric 610, a security engine 615 shared by (e.g., accessible by) the configuration engine 605 and the PLD fabric 610, and various interfaces for facilitating communication between the configuration engine 605, the PLD fabric 610, and the security engine 615. The security engine 615 includes a cryptographic hardware 620 for performing functions associated with bitstream security and user security and an interface integration logic circuit 625 for facilitating sharing/access of the cryptographic hardware 620 by the configuration engine 605 and the PLD fabric 610.

The description of FIG. 5 generally applies to FIG. 6, with examples of differences and other description provided herein. In this regard, the description of various components of FIG. 5 generally applies to like components in FIG. 6. For example, the description of the PLD 500, the configuration engine 505, the PLD fabric 510, the security engine 515, the cryptographic hardware 520, the interface integration logic circuit 525, and various interfaces therebetween generally apply to the PLD 600, the configuration engine 605, the PLD fabric 610, the security engine 615, the cryptographic hardware 620, the interface integration logic circuit 625, and various interfaces, respectively, therebetween in FIG. 6.

The configuration engine 605 communicates with a mailbox supported within the cryptographic hardware 620 via a control interface 630. For example, the control interface 630 may be an AHBL interface, such as a 32-bit AHBL interface. In an aspect, the control interface 630 may correspond, at least in part, with the control interface 530 of FIG. 5. The configuration engine 605 may write messages into the mailbox interface to select functionality of the cryptographic hardware 620 that the configuration engine 605 needs performed.

As an example, during a configuration mode of the PLD 600, a configuration bitstream flows from an external source via an external interface 672 to the configuration engine 605, and the configuration engine 605 may communicate with the cryptographic hardware 620 to perform functions on the configuration bitstream. The cryptographic hardware 620 may build a message digest for authentication and/or perform decryption. If decryption is performed, the configuration engine 605 may transmit data to be decrypted to the cryptographic hardware 620 via a data output interface 632 and the cryptographic hardware 620 may receive the data via a data input interface 652. As an example, the data output interface 632 and the data input interface 652 may correspond, at least in part, with the data output interface 532 and the data input interface 552, respectively.

The interface integration logic circuit 625 includes data converters 676 and 678 for facilitating communication between the cryptographic hardware 620 and the configuration engine 605. In FIG. 6, the data output interface 632 and a data input interface 634 of the configuration engine 605 are 8-bit wide interfaces whereas a data output interface 656 and the data input interface 652 of the cryptographic hardware 620 are 32-bit wide interfaces. The data converter 678 receives 32-bit data from the cryptographic hardware 620 and converts the 32-bit data to 8-bit data appropriate for the data input interface 634 of the configuration engine 605, and the data converter 676 converts 8-bit data from the data output interface 632 of the configuration engine 605 appropriate for the data input interface 652 of the cryptographic hardware 620. In other cases, the data input interface 634 and/or data output interface 632 of the configuration engine 605 may support the same size data as the outputs and/or inputs of the cryptographic hardware 620, in which case the data converter 676 and/or the data converter 678 may be omitted or deactivated if present.

The PLD fabric 610 communicates with a mailbox 680 via a control interface 640 to facilitate use of the security engine by the PLD fabric. For example, the control interface 640 may be an AHBL interface, such as a 32-bit AHBL interface. In an aspect, the control interface 640 may correspond, at least in part, with the control interface 540 of FIG. 5. The PLD fabric 610 may write messages into the mailbox 680 to select functionality of the cryptographic hardware 620 that the PLD fabric 610 needs performed. It is noted that in the example implementation shown in FIG. 6 the configuration engine 605 communicates with a mailbox within the cryptographic hardware 620 whereas the PLD fabric 610 communicates with the mailbox 680 external to the cryptographic hardware 620. In other implementations, the cryptographic hardware 620 may support no mailbox or multiple mailboxes.

As an example, during a user mode of the PLD 600, the PLD fabric 610 may need to encrypt data. The PLD fabric 610 may provide, via the control interface 640 to the mailbox 680, information including a source address (e.g., an address location on the PLD fabric 610) of the data to be encrypted by the cryptographic hardware 620 to obtain encrypted data, a destination address to store the encrypted data, a key to use for the encryption, a mode of operation (e.g., configuration mode or user mode), and/or other parameters. In some cases, keys used for the configuration mode may be different from keys used for the user mode. With the information from the PLD fabric 610 (e.g., as provided to the mailbox 680), the cryptographic hardware 620 obtains the data to be encrypted from the source address, generates the encrypted data, and transmits the encrypted data back to the PLD fabric 610 according to the destination address. The data and the encrypted data may be communicated via appropriate data interfaces. The PLD fabric 610 may transmit data (e.g., to the cryptographic hardware 620) via a data output interface 642 and receive data (e.g., from the cryptographic hardware 620 via a data input interface 644). The cryptographic hardware 620 may transmit data (e.g., to the PLD fabric 610) via, for example, the data output interface 656 and a data output interface 660. The cryptographic hardware 620 may receive data (e.g., from the PLD fabric 610) via, for example, the data input interface 652.

The interface integration logic circuit 625 includes multiplexers 682, 684, 686, and 686 to facilitate sharing of the cryptographic hardware 620 by appropriately routing data provided by data interfaces. The multiplexers 682, 684, 686, and 688 may control routing based on a current controller of the cryptographic hardware 620. The multiplexer 682 receives data output by the cryptographic hardware 620 on the data output interface 656 and selectively routes the data to the configuration engine 605 via, in part, the data input interface 634 of the configuration engine 605 or to the PLD fabric 610 via, in part, the data input interface 644 of the PLD fabric 610. For example, when the PLD fabric 610 currently controls the cryptographic hardware 620, operations (e.g., security functions) performed by the cryptographic hardware 620 are performed based on instructions/requests from the PLD fabric 610 and the multiplexer 682 appropriately routes the output of the cryptographic hardware 620 to the PLD fabric 610. The multiplexer 684 receives data from the configuration engine 605 and/or the PLD fabric 610 and selectively the data the current controller of the cryptographic hardware 620. In general, when an entity (e.g., the PLD fabric 610) controls the cryptographic hardware 620, the other entity (e.g., the configuration engine 605) is generally not transmitting data to the cryptographic hardware 620. The multiplexer 686 selectively routes, based on a function call, one of its two inputs to the PLD fabric 610. The multiplexer 686 selectively routes, based on a function call, its input to one of two data interfaces to the cryptographic hardware 620. In an aspect, the multiplexers 684 and 688 may form a multiplexer circuit that facilitates routing of data from the configuration engine 605 or the PLD fabric 610 to the cryptographic hardware 620, and the multiplexers 682 and 686 may form a multiplexer circuit that facilitates routing of data from the cryptographic hardware 620 to the configuration engine 605 or the PLD fabric 610.

The interface integration logic circuit 625 includes clock domain crossing blocks 690, 692, and 694 provided between the PLD fabric 610 and the cryptographic hardware 620. Although not shown in FIG. 6, one or more clock domain crossing blocks may be provided between the configuration engine 605 and the cryptographic hardware 620. Clock domain crossing blocks may be used to facilitate operation between different clock domains that may be present in the PLD 610.

The PLD fabric 610 may initiate communication with the configuration engine 605 via an interface 670 to transfer/switch (e.g., temporarily transfer/switch) control of the security engine 615 (e.g., to use the cryptographic hardware 620) from the configuration engine 605 to the PLD fabric 610. In an aspect, the interface 670 may correspond, at least in part, with the control interface 570 of FIG. 5. The configuration engine 605 communicates with the security engine 625 to arrange the control transfer. In such an embodiment, the configuration engine 605 is consistently able to communicate with the security engine 625, whereas the PLD fabric may communicate with the security engine 615 only when the PLD fabric 610 has control of the security engine 615.

It is noted that the security engine 615 includes additional blocks 674 that perform various typical functionality described with respect to the additional blocks 574 of FIG. 5. As described with respect to the additional blocks 574, in some cases one or more, or all, of the additional blocks 574 may be implemented inside the cryptographic hardware 620. Implementation of the additional blocks 674 is generally a design choice.

Figure 7:
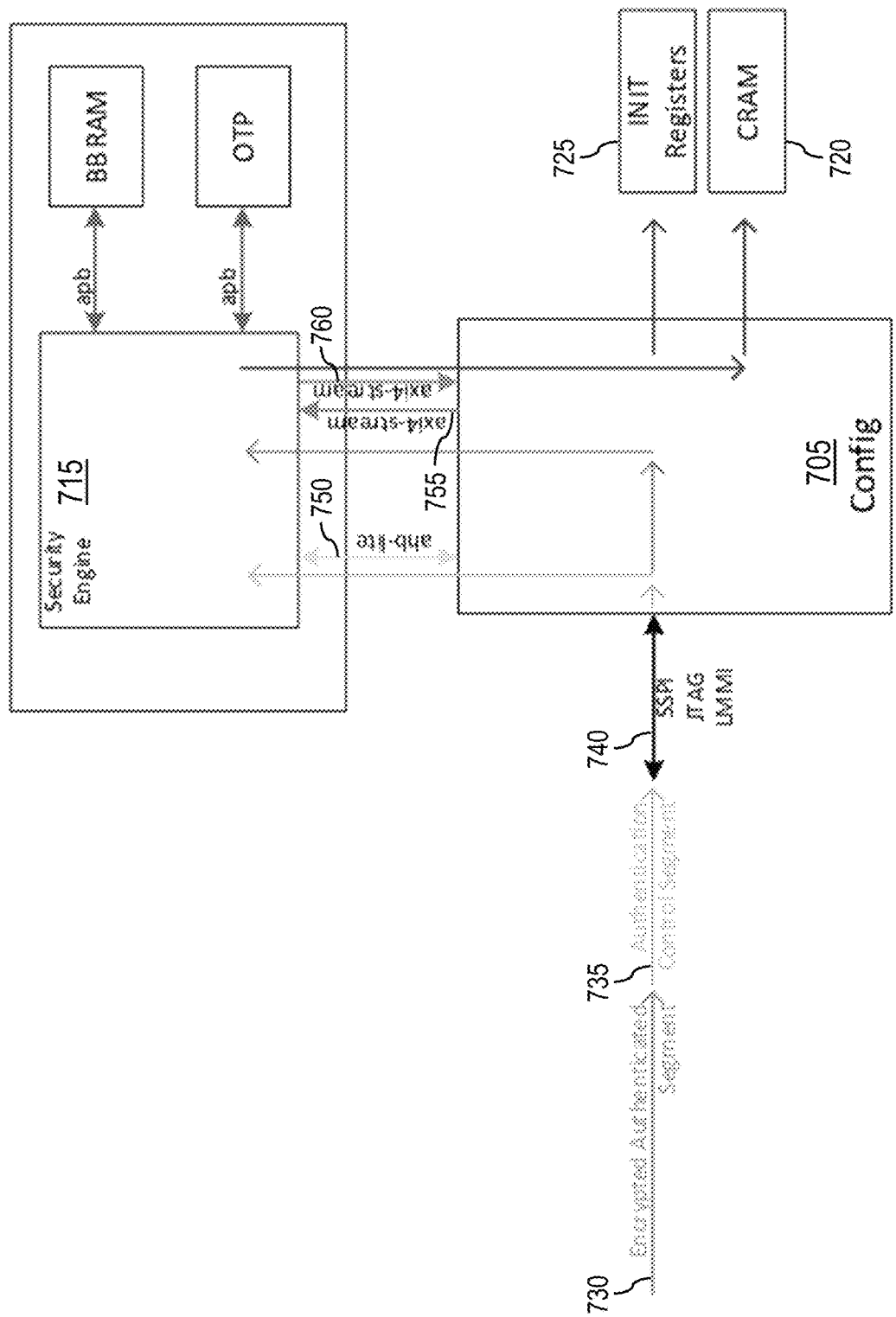
FIG. 7 illustrates an example data flow for an encrypted and authenticated bitstream when a PLD is in a configuration mode in accordance with one or more embodiments of the present disclosure.

FIG. 7 illustrates an example data flow for an encrypted and authenticated bitstream when a PLD is in a configuration mode in accordance with one or more embodiments of the present disclosure. Components of an interface integration logic are not shown in FIG. 7. The PLD includes a configuration engine 705, a security engine 715, configuration random access memory (CRAM) array 720, and registers 725. The encrypted and authenticated bitstream includes an encrypted authenticated segment 730 and an authentication control segment 735. The configuration engine 705 may receive the encrypted authenticated segment 730 and the authentication control segment 735 via a configuration interface 740 from an external source.

The configuration engine 705 may direct the authentication control segment 735 via a control interface 750 to the security engine 715 and request/program the security engine 715 to process the encrypted authenticated segment 730. The configuration engine 705 may direct the encrypted authenticated segment 730 via a data interface 755 to the security engine 715 for processing. The security engine 715 may decrypt the encrypted authenticated segment 730 and route the decrypted bitstream back to the configuration engine 705 via a data interface 760. The configuration engine 705 may use the decrypted bitstream to program the CRAM array 720 and set the registers 725.

In an embodiment, the configuration engine 705 may be, may include, or may be a part of the configuration engine 505; the security engine 715 may be, may include, or may be a part of the security engine 515; the CRAM array 720 may be part of the PLD fabric 510; the configuration interface 740 may be, may include, or may be a part of the configuration interface 572; the control interface 750 may be, may include, or may be a part of the control interfaces 530 and 550; the data output interface 755 may be, may include, or may be a part of the data interfaces 532, 552, and 554; and the data input interface 760 may be, may include, or may be a part of the data interfaces 534, 556, and 558.

Figure 8:
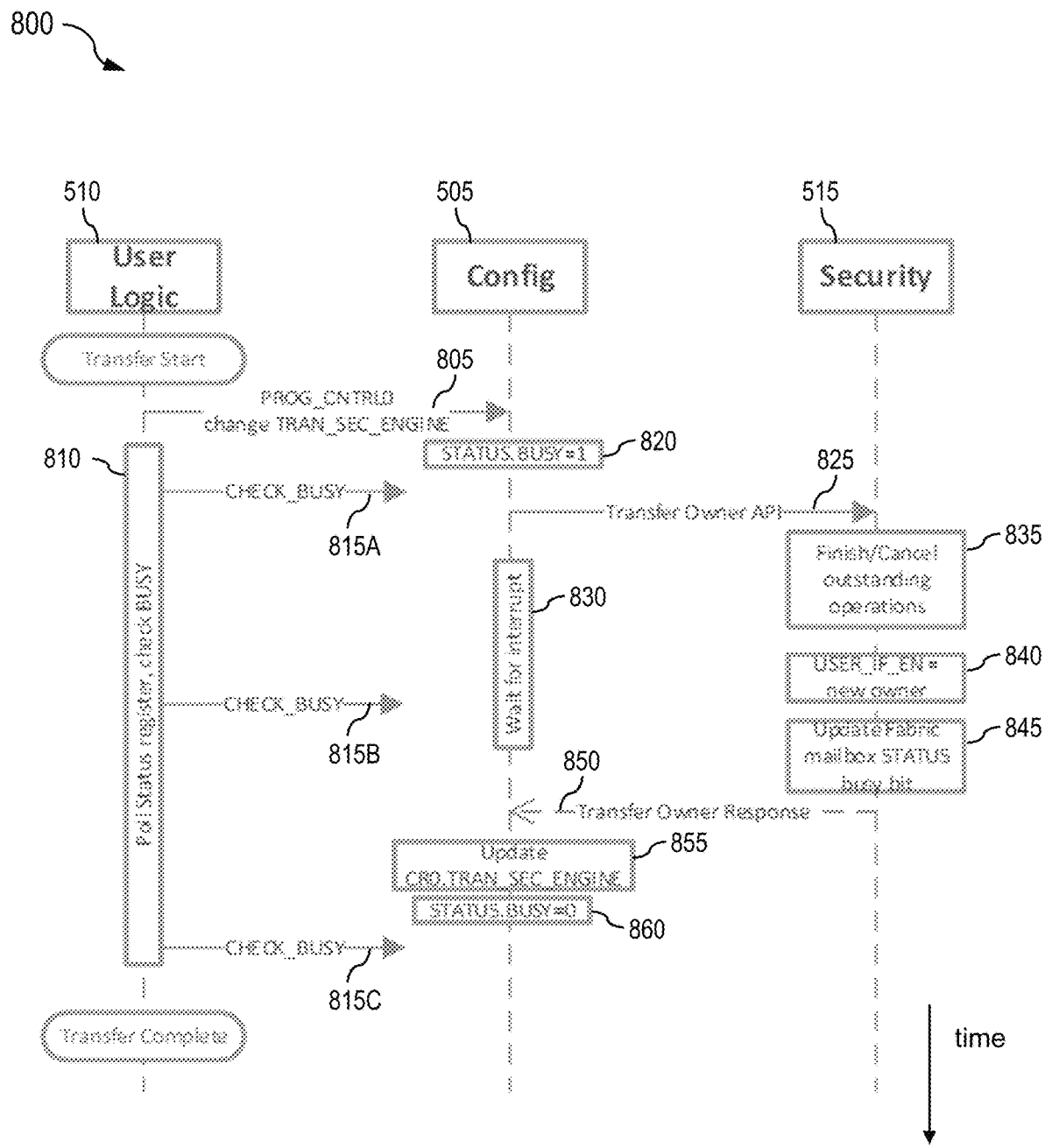
FIG. 8 illustrates a flow diagram of an example process for control transfer of a security engine in accordance with one or more embodiments of the present disclosure.

FIG. 8 illustrates a flow diagram of an example process 800 for control transfer of the security engine 515 in accordance with one or more embodiments of the present disclosure. Although, for explanatory purposes, the process 800 is described with reference to systems, devices, processes, and elements of FIG. 5, the process 800 may be performed by other systems, devices, and elements, and including a different selection of electronic systems, devices, elements, assemblies, and/or arrangements. At the initiation of the process, various system parameters may be populated by prior execution of a process similar to the process, for example, or may be initialized to zero and/or one or more values corresponding to typical, stored, and/or learned values derived from past operation of the process. Note that one or more operations may be combined, omitted, and/or performed in a different order as desired.

In operation 805, the PLD fabric 510 transmits a control request signal to the configuration engine 505 to request control of the security engine 515 from the configuration engine 505 to the PLD fabric 510. The control request signal may be transmitted to the configuration engine 505 via the interface 570. In some cases, the PLD fabric 510 may transmit the control request signal when the PLD fabric 510 needs to use and/or anticipates needing to use the security engine 515.

During a time duration 810, the PLD fabric 510 periodically checks, in operations 815A, 815B, and 815C, for a status of a busy bit stored in a memory of the configuration engine 505. The busy bit may be indicative of whether the configuration engine 505 is using (e.g., is busy using) and/or has control (e.g., may or may not be actively using) of the security engine 515. At a time 820, the busy bit is set to a 1 state, indicating control of the security engine 515 is with the configuration engine 505.

In operation 825, the configuration engine 505 transmits a control transfer request signal to the security engine 515. The control transfer request signal may be transmitted to the security engine 515 via the control interface 530. In some cases, the configuration engine 505 may transmit the control transfer request signal to the security engine 515 when the configuration engine 825 no longer needs to access/call security functions of the security engine 515. During a time duration 830, the configuration engine 825 waits for any interrupts from the security engine 515.

In operation 835, the security engine 515 finishes or cancels any outstanding security operations for the configuration engine 505 in response to the control transfer request signal from the configuration engine 505. In some aspects, whether the security engine 515 finishes or cancels any outstanding operations may be based on application, user preference, priority associated with security functions called by the configuration engine 505 and/or the PLD fabric 510, and/or other configurations. In operations 840 and 845, the security engine 515 sets flags to indicate the PLD fabric 510 is the new/current controller of the security engine 515. In operation 840, the flag may be stored in the security engine 815. In operation 845, the flag may be set in a mailbox of the PLD fabric 510. In operation 850, the security engine 515 transmits a control transfer response signal to the configuration engine 505. In some cases, the control transfer response signal may be routed to one or more of the interrupt interfaces (e.g., 562, 564), which may then be routed to the interrupt 536 connected to the configuration engine 505. In some cases, alternatively or in addition, the response message may be written to a mailbox by the security engine 515.

In operation 855, the configuration engine 505 sets a flag indicating the PLD fabric 510 to be the new/current controller of the security engine 515 in response to the control transfer response signal. In operation 855, the flag may be stored in the security engine 815. In operation 860, the configuration engine 505 sets the busy bit to 0 to indicate the configuration engine 505 no longer controls the security engine 515. In some cases, the busy bit may be stored in the configuration engine 505. During the period check of the busy bit by the PLD fabric 510 in operation 815C, the PLD fabric 510 determines that the PLD fabric 510 the control transfer occurred successfully and the PLD fabric 510 is the new/current controller of the security engine 515. Each of the busy bit stored in the configuration engine 505 in operation 860 and the flags set in operations 840 and 845 may be provide a security engine control indicator whose value indicates whether the configuration engine 505 or the PLD fabric 510 currently controls the security engine 515.

A similar process may occur for transferring control of the security engine 515 from the PLD fabric 510 back to the configuration engine 505. To initiate the transfer of control back to the configuration engine 505, the configuration engine 505 may transmit a control request signal to the security engine 515 to request control of the security engine 515 from the PLD fabric 510 to the configuration engine 505. In some cases, the configuration engine 505 may transmit the control request signal when the configuration engine 505 needs to use and/or anticipates needing to use the security engine 515 (e.g., for a dry-run during user mode operation of the PLD 500). The security engine 515 may finish and/or cancel one or more outstanding operations for the PLD fabric 510 and update appropriate indicators (e.g., flags, bits) to set the new/current controller of the security engine 515 to the configuration engine 505. The security engine 515 may transmit a control transfer response signal to the configuration engine 505. The configuration engine 505 may update appropriate flags to identify itself as the current controller of the security engine 515. In some embodiments, an overall flow of the control transfer of the security engine 515 to/from the configuration engine 505 and the PLD fabric 510 are generally the same regardless of control transfer direction.

In some embodiments, the configuration engine 505 may relinquish/handoff control of the security engine 515 (e.g., without any control transfer request from the PLD fabric 510). For example, the configuration engine 505 may determine that it no longer needs to perform bitstream security using the security engine 515 and handoff control of the security engine 515 to the PLD fabric 510. In a control transfer in any direction, the current controller of the security engine 515 may be notified of the transfer in control. Control may be taken from the PLD fabric 510 and given back to the configuration engine 505.

Figure 9:
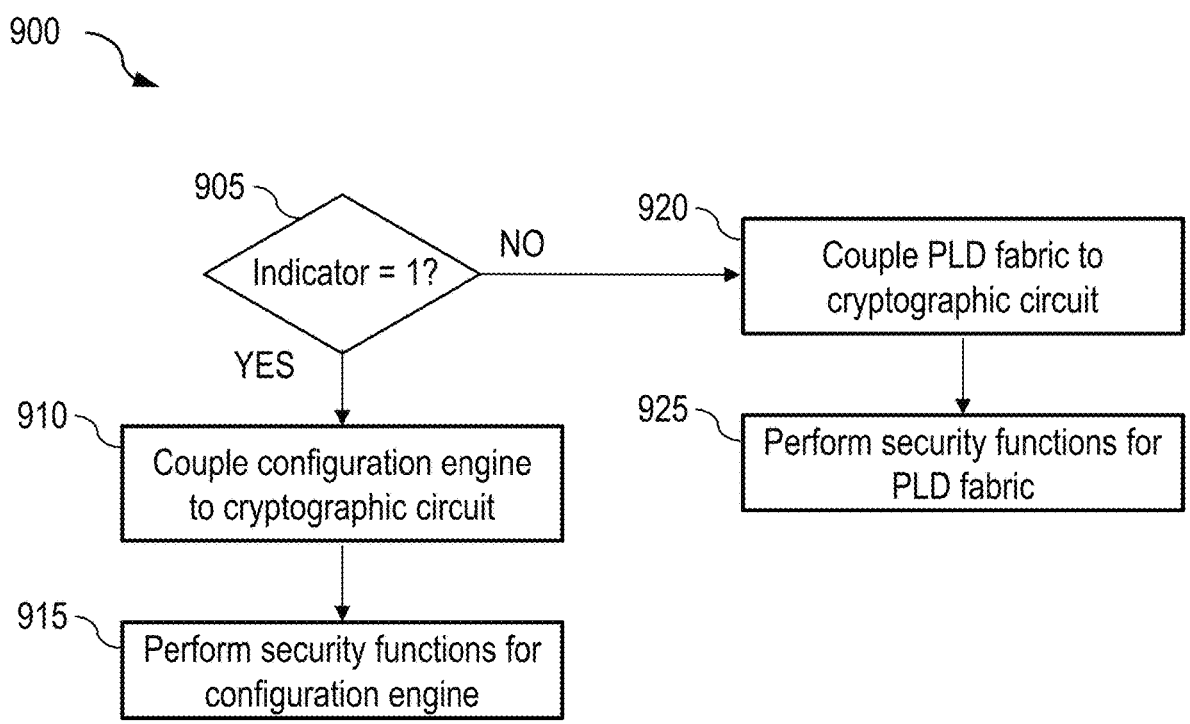
FIG. 9 illustrates a flow diagram of an example process for facilitating cryptographic hardware sharing in accordance with one or more embodiments of the present disclosure.

FIG. 9 illustrates a flow diagram of an example process 900 for facilitating cryptographic hardware sharing in accordance with one or more embodiments of the present disclosure. Although, for explanatory purposes, the process 900 is described with reference to systems, devices, processes, and elements of FIG. 5, the process 900 may be performed by other systems, devices, and elements, and including a different selection of electronic systems, devices, elements, assemblies, and/or arrangements. At the initiation of the process, various system parameters may be populated by prior execution of a process similar to the process, for example, or may be initialized to zero and/or one or more values corresponding to typical, stored, and/or learned values derived from past operation of the process. Note that one or more operations may be combined, omitted, and/or performed in a different order as desired.

At block 905, the interface integration logic circuit 525 determines whether a security engine control indicator has a value set to 1. For explanatory purposes, the security engine control indicator may be 1 when the configuration engine 505 controls the security engine 515 and 0 when the PLD fabric 510 controls the security engine 515.

When the determination is that the indicator is set to 1, the process 900 proceeds to block 910. At block 910, the interface integration logic circuit 525 couples the configuration engine 505 to the cryptographic hardware 520. At block 915, the cryptographic hardware 520 performs security functions for the configuration engine 505.

When the determination is that the indicator is set to 0, the process 900 proceeds to block 920. At block 920, the interface integration logic circuit 525 couples the PLD fabric 510 to the cryptographic hardware 520. At block 925, the cryptographic hardware 520 performs security functions for the PLD fabric 510. In this regard, blocks 905, 910, and 920 collectively provide a step in which interface integration logic circuit 525 selectively couples, based on the security engine control indicator, the cryptographic hardware 520 to the configuration engine 505 or the PLD fabric 510.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A programmable logic device (PLD) comprising:
a configuration engine configured to provide configuration data for processing using a first set of security functions;
a PLD fabric comprising an array of memory cells configured to operate upon being programmed based on the configuration data and configured to provide user data for processing using a second set of security functions; and
a security engine comprising:
a cryptographic circuit; and
an interface integration logic circuit configured to selectively couple, based on a security engine control indicator, the configuration engine to the cryptographic circuit or the PLD fabric to the cryptographic circuit, wherein the cryptographic circuit is configured to perform the first set of security functions for the configuration engine when coupled to the configuration engine by the interface integration logic circuit and/or the second set of security functions for the PLD fabric when coupled to the PLD fabric by the interface integration logic circuit.

2. The PLD of claim 1, wherein the interface integration logic circuit comprises:
a first multiplexer circuit configured to selectively route, based on the security engine control indicator, output data from the cryptographic circuit to the configuration engine or the PLD fabric; and
a second multiplexer circuit configured to selectively route, based on the security engine control indicator, output data from the configuration engine or the PLD fabric to the cryptographic circuit.

3. The PLD of claim 2, wherein, when the security engine control indicator has a value indicating the configuration engine has control of the security engine, the first multiplexer circuit is configured to receive the output data from the cryptographic circuit on a first data interface connecting the cryptographic circuit to the first multiplexer circuit and route the output data on the first data interface to a second data interface connected to the configuration engine.

4. The PLD of claim 1, wherein the interface integration logic circuit comprises a clock domain crossing circuit configured to connect to the PLD fabric on one end and the cryptographic circuit on another end.

5. The PLD of claim 1, wherein the configuration engine is configured to transmit information associated with the first set of security functions to a first mailbox on a control interface connecting the configuration engine to the first mailbox, and wherein the cryptographic circuit is configured to perform the first set of security functions based in part on the information.

6. The PLD of claim 5, wherein the first mailbox forms a part of the interface integration logic circuit or the cryptographic circuit.

7. The PLD of claim 5, wherein the PLD fabric is configured to transmit information associated with the second set of security functions to a second mailbox on a control interface connecting the PLD fabric to the second mailbox.

8. The PLD of claim 1, wherein:
the PLD fabric is configured to transmit a first control request signal to the configuration engine or the security engine;
the security engine is configured to transition the security engine control indicator to a value indicative of control of the security engine by the PLD fabric in response to the first control request signal; and
the interface integration logic circuit is configured to couple the PLD fabric to the cryptographic circuit in response to the transitioned security engine control indicator.

9. The PLD of claim 8, wherein:
the PLD fabric is configured to transmit the first control request signal to the configuration engine;
the configuration engine is configured to transmit a control transfer request signal to the security engine in response to the first control request signal;
the security engine is configured to, in response to the control transfer request signal, transmit a control transfer response to the configuration engine and transition the security engine control indicator;
the configuration engine is configured to deassert a security engine usage indicator in response to the control transfer response; and
the PLD fabric is configured to determine whether the PLD fabric has control of the security engine based on the security engine usage indicator.

10. The PLD of claim 8, wherein:
the configuration engine is configured to transmit a second control request signal to the security engine;
the security engine is configured to further transition the security engine control indicator to a value indicative of control of the security engine from the PLD fabric back to the configuration engine in response to the second control request signal; and
the interface integration logic circuit is configured to couple the configuration engine to the cryptographic circuit in response to the further transitioned security engine control indicator.

11. The PLD of claim 1, wherein the first set of security functions comprises authenticating and/or decrypting the configuration data, and/or wherein the second set of security functions comprises true random number generation, hashing, encryption, authentication, and/or key generation associated with the user data.

12. A method comprising:
selectively coupling, by an interface integration logic circuit based on a security engine control indicator, a configuration engine to a cryptographic circuit or a programmable logic device (PLD) fabric to the cryptographic circuit;
performing a first set of security functions on configuration data from the configuration engine if the cryptographic circuit is coupled to the configuration engine by the interface integration logic circuit, wherein the PLD fabric comprises an array of memory cells programmed based on the configuration data; and
performing a second set of security functions on user data from the PLD fabric if the cryptographic circuit is coupled to the PLD fabric by the interface integration logic circuit.

13. The method of claim 12, wherein the selectively coupling comprises:
- selectively routing, by a first multiplexer circuit based on the security engine control indicator, output data from the cryptographic circuit to the configuration engine or the PLD fabric; and
- selectively routing, by a second multiplexer circuit based on the security engine control indicator, output data from the configuration engine or the PLD fabric to the cryptographic circuit.

14. The method of claim 13, wherein, when the security engine control indicator has a value indicating the configuration engine has control of the security engine, the first multiplexer circuit receives the output data from the cryptographic circuit on a first data interface connecting the cryptographic circuit to the first multiplexer circuit and routes the output data on the first data interface to a second data interface connected to the configuration engine.

15. The method of claim 12, further comprising transmitting, by the configuration engine, information associated with the first set of security functions to a first mailbox on a control interface connecting the configuration engine to the first mailbox, wherein the performing the first set of security functions is based in part on the information.

16. The method of claim 15, further comprising transmitting, by the PLD fabric, information associated with the second set of security functions to a second mailbox on a control interface connecting the PLD fabric to the second mailbox.

17. The method of claim 16, wherein the second mailbox forms a part of the interface integration logic circuit or the cryptographic circuit.

18. The method of claim 12, further comprising:
- transmitting, by the PLD fabric, a control request signal to the configuration engine or the security engine; and
- transitioning, by the security engine, the security engine control indicator to a value indicative of control of the security engine by the PLD fabric in response to the control request signal, wherein the interface integration logic circuit couples the PLD fabric to the cryptographic circuit in response to the transitioned security engine control indicator.

19. The method of claim 18, wherein the PLD fabric transmits the control request signal to the configuration engine, the method further comprising:
- transmitting, by the configuration engine, a control transfer request signal to the security engine in response to the control request signal;
- transmitting, by the security engine, a control transfer response to the configuration engine;
- deasserting, by the configuration engine, a security engine usage indicator in response to the control transfer response; and
- determining, by the PLD fabric, whether the PLD fabric has control of the security engine based on the security engine usage indicator.

20. The method of claim 12, wherein the first set of security functions comprises authenticating and/or decrypting the configuration data, and/or wherein the second set of security functions comprises true random number generation, hashing, encryption, authentication, and/or key generation associated with the user data.

\* \* \* \* \*

UNITED STATES PATENT AND TRADEMARK OFFICE
CERTIFICATE OF CORRECTION

| | | |
|---|---|---|
| PATENT NO. | : 12,445,132 B2 | Page 1 of 1 |
| APPLICATION NO. | : 18/525388 | |
| DATED | : October 14, 2025 | |
| INVENTOR(S) | : Tim Vogt et al. | |

It is certified that error appears in the above-identified patent and that said Letters Patent is hereby corrected as shown below:

In the Specification

Column 10, Line 67, change "one or more of a JTAG, 12C, SPI" to --one or more of a JTAG, I2C, SPI--.

Signed and Sealed this
Eighteenth Day of November, 2025

John A. Squires
*Director of the United States Patent and Trademark Office*